United States Patent [19]
Kurz et al.

[11] 4,279,668
[45] * Jul. 21, 1981

[54] DIRECTIONALLY SOLIDIFIED DUCTILE MAGNETIC ALLOY

[75] Inventors: Wilfried Kurz, Lausanne, Switzerland; Remi Glardon, Berkeley, Calif.

[73] Assignee: Les Fabriques d'Assortiments Reunies-Div. R, LeLocle, Switzerland

[ * ] Notice: The portion of the term of this patent subsequent to Jun. 17, 1997, has been disclaimed.

[21] Appl. No.: 29,477

[22] Filed: Apr. 12, 1979

Related U.S. Application Data

[63] Continuation-in-part of Ser. No. 849,956, Nov. 9, 1977, Pat. No. 4,208,225, which is a continuation-in-part of Ser. No. 683,617, May 5, 1976, abandoned.

[30] Foreign Application Priority Data

May 5, 1975 [CH] Switzerland ..................... 005725/75

[51] Int. Cl.³ ......................... C04B 35/00; H01F 1/04
[52] U.S. Cl. .................................. 148/101; 148/31.57
[58] Field of Search .............................. 148/31.57, 101

[56] References Cited

U.S. PATENT DOCUMENTS

| | | | |
|---|---|---|---|
| 3,982,971 | 9/1976 | Yamanaka et al. | 148/31.57 |
| 4,081,297 | 3/1978 | Nagel et al. | 148/103 |
| 4,082,582 | 4/1978 | Menth et al. | 148/102 |
| 4,099,995 | 7/1978 | Menth et al. | 148/101 |
| 4,116,726 | 9/1978 | Menth et al. | 148/31.57 |
| 4,135,953 | 1/1979 | Nagel et al. | 148/103 |

OTHER PUBLICATIONS

Chin et al., IEEE Trans. Magnetics, Mar. 1972, pp. 29–35.
Senno et al., Japan J. Appl. Phys. 14 (1975), p. 1619.

*Primary Examiner*—L. Dewayne Rutledge
*Assistant Examiner*—Upendra Roy
*Attorney, Agent, or Firm*—Karl F. Ross

[57] ABSTRACT

Magnetic alloys of a ternary composition as defined within the region A, B, C, D of the ternary diagram of FIG. 5, wherein X is one or more metals selected from the group which consists of iron, nickel, aluminum, copper, molybdenum and manganese and preferably includes 0.1 to 10% atomic (most advantageously 1 to 5% atomic chromium of the entire alloy), are cast and rendered ductile by the formation within the material during solidification of at least two phases. One of the phases is preferably ductile and formed essentially of fibers or dendrites of Co and the other phase or phases are from those normally found in rare-earth/cobalt magnets. The alloy is magnetically hardened by precipitation hardening. The chromium appears predominantly in the fiber or dendrite phase and promotes the formation of the latter.

1 Claim, 11 Drawing Figures

*Three point banding test diagram on an alloy without ductile dendrites.*

*fracture energy* $\gamma_F = 5\ J/m^2$

DIRECTIONALLY SOLIDIFIED DUCTILE MAGNETIC ALLOY

CROSS REFERENCE TO RELATED APPLICATION

This application is a continuation-in-part of Ser. No. 849,956, filed Nov. 9, 1977 now U.S. Pat. No. 4,208,225 which, in turn, is a continuation in part of Ser. No. 683,617 filed May 5, 1976, now abandoned.

FIELD OF THE INVENTION

The present invention relates to a process for the fabrication of magnetic alloys for permanent magnets and to the magnetic bodies obtained by this process.

More particularly the invention relates to ternary magnetic alloys consisting of rare-earth or rare-earth-like elements, cobalt and at least one metal selected from the group which consists of iron, nickel, aluminum, copper, molybdenum or manganese. Preferably the latter metal phase includes 0.1 to 10% (atomic) of the total alloy as chromium, an element which appears to promote dendrite or fiber formation.

BACKGROUND OF THE INVENTION

Ferromagnetic alloys of the cobalt/rare-earth type have a high energy product and for this reason have been widely used. At present they are generally fabricated by powder metallurgy, i.e. by sintering, high-pressure pressing or the like techniques. For example, powders of rare-earth/cobalt can be sheathed (enrobed) in a tin alloy and compacted or shaped therein. The alloys generally have the formula $TRCo_y$, where TR is a rare-earth element such as samarium (Sm), gadolinium (Gd), praseodymium (Pr), cerium (Ce), neodymium (Nd), holmium (Ho) or an element similar to a rare-earth such as lanthanum (La) or yttrium (Y) or a mixture of such elements. y varies between 5 and 8.5.

Although these materials are remarkable for their magnetic properties, having a high intrinsic coercive force of, say, 25 kiloOersted (kOe) and a high saturation magnetization of, say, 10 kiloGauss (kG), resulting in a high energy product, they are fragile, difficult to work and sensitive to environmental conditions. Because of these shortcomings, the fabrication of small magnets by machining is difficult. When attempts are made to fabricate large magnets, it is found that the bodies tend to break during fabrication because of internal stresses.

Alloys containing copper as well as $TRCo_y$ which are prepared by casting have also been proposed heretofore. These alloys are subjected to a magnetic hardening treatment but are also found to be very brittle and difficult to work, particularly by turning and similar machining operations.

OBJECTS OF THE INVENTION

It is the principal object of the present invention to provide a process for fabricating high-performance magnets, especially of small dimensions and high precision, and also large magnets, which enables casting to be used and provides a product which can be subsequently machined without the difficulties encountered heretofore.

Another object of the invention is to provide a magnetic alloy which is free from the aforementioned disadvantages.

Still another object of the invention is to provide magnets which are readily machined and yet retain the high magnetic-energy products B×H characteristic of rate-earth/cobalt magnets.

Yet another object is to extend the principles of the above-mentioned applications.

SUMMARY OF THE INVENTION

According to the invention, a magnetic alloy for making ductile permanent magnet by directional solidification has a ductile phase composed essentially of Co (or cobalt in combination with iron or chromium) is formed, which is dispersed in a magnetic matrix whose composition lies between TR $(Co, X)_5$ and $TR_2$ $(Co, X)_{17}$, the alloy consisting essentially of TR, cobalt and X, where TR is at least one element selected from the group which consists of samarium, gadolinium, praseodymium, cerium, neodymium, holmium, lanthanum and yttrium, X is at least one metal selected from the group comprising copper, iron, nickel, chromium, aluminum, molybdenum and manganese, TR is present in an amount of 10 to 15 at. % of the alloy, X is present in an amount of 10 to 40 at. % of the alloy and cobalt is present in an amount of 50 to 80 at. % of the alloy. Preferably X includes iron and/or chromium in an amount of 0.1 to 10% (atomic) of the alloy and, most advantageously, chromium in an amount of 1 to 5% (atomic) of the alloy (inclusive).

Advantageously the ternary composition is a composition represented by the shaded region A, B, C, D, (preferably A', B', C', D') of FIG. 5 and consists of 5 to 16.7 at. % (atomic percent) of the rare-earth-type element TR, 5 to 50 at. % of at least one supplemental metal X selected from the group consisting of iron, nickel, aluminum, chromium, copper, molybdenum or manganese. X can also represent a combination of one or more of these metals. The balance is cobalt.

For the purpose of this application TR represents elements selected from the group which consists of Sm, Gd, Pr, Ce, Nd, Ho, La and Y.

Unless otherwise indicated all percent compositions given herein are in atomic percent (at. %).

In many cases the mixtures required for "TR" and "X" in order that the Co dendrites be present resulted in just sufficient magnetic properties, especially in rather low values of the coercive force, compared with those obtainable in a system based on Co and Sm.

We have now discovered that additions of chromium to such alloys in relatively small quantities have the surprising effect of provoking the formation of ductile dendrites without significantly affecting the magnetic properties of the matrix.

Iron, which also is included in component X also has a similar effect, but not so pronounced as Cr. Useful magnets can however be made especially well when the Cr additions are made to alloy compositions already containing a certain proportion of Fe. The reasons for the effectiveness of Cr as a dendrite former in these materials can be partially explained by the results obtained by microprobe analysis for the compositions of the phases present: the Cr appears to be preferentially incorporated into the ductile dendrite phase, leaving relatively little in the matrix phases to interfere with their (magnetic) hardenability. The Fe is similarly distributed preferentially into the ductile dendrites, though the effect is less pronounced as can also be seen in Table 1.

The quantities of Cr required depend on the proportions of the components TR and X relative to the Co content as can be seen from the examples in Table 2 together with an indication of the magnetic hardening which can be achieved.

The incorporation of the Cr into the dendrite phase in the form of a solid solution does not markedly affect the ductility of the phase, although the magnetic saturation can be substantially modified; Fe additions increasing the value, and Cr additions strongly reducing it. The dendrites do not seem to have a major effect on the magnetic properties of the bulk material. They do, however, have secondary effects by reducing squareness of the hysteresis loop. The reduction of $M_S$ of the dendrites due to the Cr is therefore an advantage as the loop squareness is less deformed.

The magnetic properties of the matrix phases are also affected by the addition of Cr but the effects are only small as relatively little Cr is incorporated into the matrix phases. The value of $M_S$ is slightly reduced, but most importantly there is very little effect on the hardenability ($H_c$) as compared with that obtained in the Sm—Co—Cu materials without the dendrites. At the Cr concentration levels required to form the dendrites, the reactions responsible for the magnetic hardening appear undisturbed.

A further consequence of the small quantities of Cr required to form the dendrites, and the coercive field obtained from such alloys, is that it is now much easier to make a useful magnet which is poor in the TR component (i.e. the matrix phases of the TR $(Co,X)_5$ and $TR_2$ $(Co,X)_{17}$ type phase, which has less TR.

Such alloys have two advantages—the amount of costly rare earth in the alloy is minimized, and the properties are improved, since the $Sm_2Co_{17}$ type compounds have a significantly higher saturation magnetization than the $SmCo_5$ type compounds (12.8 kGs and 11.2 kGs respectively).

In principle the alloy composition could be adjusted such that no $TR(Co,X)_5$ compound is formed, the magnet then consisting only of ductile Co dendrites and the $TR(Co,X)_{17}$ phase. However we have found that a certain proportion of the $TR(Co,X)_5$ type phase is of considerable aid, and that the composition is advantageously adjusted such that approximately 5–30% of the magnet consists of this phase. (The proportion is for the finished material, after heat-treatment; before heat treatment the volume fraction of this phase is rather high).

There are two advantages in maintaining the presence of the $TR(Co,X)_5$ type phase; firstly the production of the oriented structure formed by directional solidification is facilitated and secondly the presence of a small proportion of the $TR(Co,X)_5$ phase improves the hardenability (increases $H_c$) of the material.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLES

Figure 1:
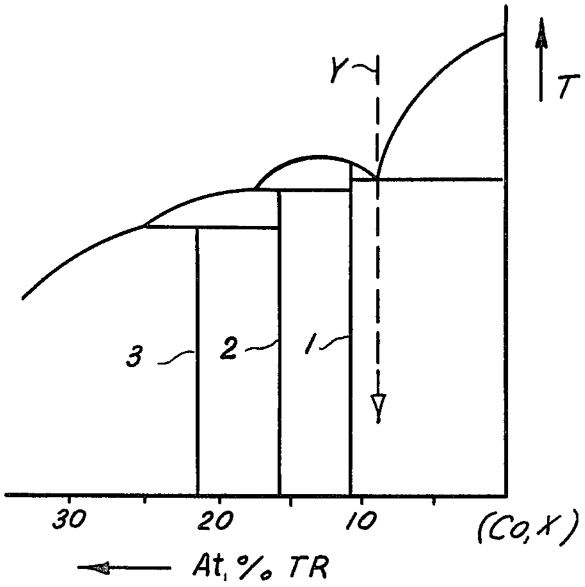
FIG. 1 is a schematic phase diagram illustrating an eutectic composition and serving for the purposes of explanation of a process according to the present invention.

The ordinate in FIG. 1 represents the temperature T while the abscissa shows the content in atomic percent of TR, the vertical lines 1, 2 and 3 indicating respectively the compositions within the ambit of the present invention. X may be one or more metals selected from the group which consists of iron, nickel, aluminum, chromium, copper, molybdenum and manganese. The alloy should contain 0.1 to 10% (atomic) iron and/or chromium with 0.1 to 5% (atomic) chromium present in any event. The most preferred composition contains 0.5% to 5% and more advantageously 1 to 5% chromium (atomic).

A molten alloy of the composition y (FIG. 1) will cool along the arrow to give a eutectic mixture of the matrix of $TR_2(Co,X)_{17}$ and fibers or lamellae of another phase such as (Co,X). X, as noted, represents an element which can be substituted for cobalt such as iron, nickel, aluminum, copper, chromium, molybdenum and manganese for a mixture thereof such as iron and chromium with copper, or copper plus nickel, for example.

During the solidification, ductile fibers 11 (FIG. 3) in a magnetic matrix 12 are obtained. The solidification front 13 separates the liquid phase 14 from the solidifying phase 15. At 16 are shown the various interfaces between the two phases. 17 represents the distance between the ductile fibers which can vary between 1 and 10 microns according to the speed of solidification. The fiber length is a multiple of the distance between the fibers and the fibers may extend continuously throughout the body or in lengths upward of 100 microns.

Figure 2:
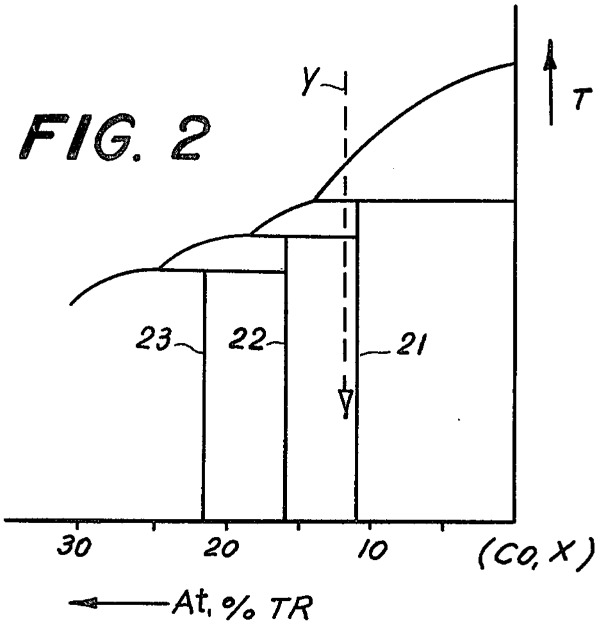
FIG. 2 is a schematic phase diagram illustrating a peritectic composition enabling another form of the process to be explained.

It is also possible to obtain a composite formed of a magnetic matrix TR $(Co,X)_{5\ to\ 8.5}$ (y=5 to 8.5) together with a ductile phase (Co,X) in cellular or dendritic form. An alloy is solidified along the line y (FIG. 2). In this Figure, as in FIG. 1, T represents the temperature and is plotted along the ordinate while the TR content, in atomic percent is plotted along the abscissa. The lines 21, 22 and 23 represent the compounds $TR_2$ $(Co,X)_{17}$, $TR(Co,X)_5$ and $TR_2$ $(Co,X)_7$.

Figure 4:
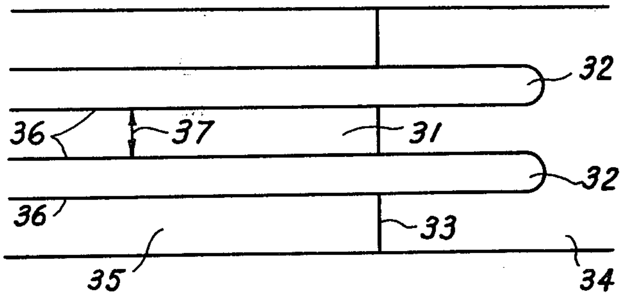
FIG. 4 is a diagram illustrating the cellular or dendrite growth which results when the process illustrated by FIG. 2 is carried out.

Ductile dendrites 32 (FIG. 4) are obtained in the magnetic matrix 31 from the system of FIG. 2. The solidification front 33 separates the liquid phase 34 from the solid phase 35. The interfaces are shown at 36 and the distance between the dendritic fibers 37 is larger than in the previous case, e.g. about 50 microns. The fiber length may exceed 100 microns and the diameter of the fibers may be 25 to 30 microns on the average.

A brittle body can be made tougher according to the invention, by the introduction of a second ductile phase, with its associated interphase boundaries in the material. A composite body formed of two brittle phases is tougher than either of the phases taken alone and the mechanical properties of the composite body containing the two phases are improved. Even better properties can be obtained when one of the phases is a ductile phase which is associated with the brittle phase. The workability of the body is improved by the double effect of the prsence of a ductile phase and the existence of phase interfaces.

The mechanical and particularly the magnetic properties of the alloys according to the invention can be improved by controlling the solidification to give an oriented structure as described. A directional-solidification furnace as described in U.S. Pat. No. 3,871,835 issued Mar. 18, 1975 can be used to achieve this process. Such a directional-solidification furnace may include a crucible which is moved at a predetermined speed relative to the heating elements just allowing the solidification conditions, the liquidus/solidus interface temperature gradient, solidification speed and the like to be established as is necessary to ensure the growth of the fiber phase.

The orientation is primarily important for obtaining the optimum magnetic properties. Magnetic hardening in all cases is obtained by provoking precipitation as is conventional in the art.

Figure 3:
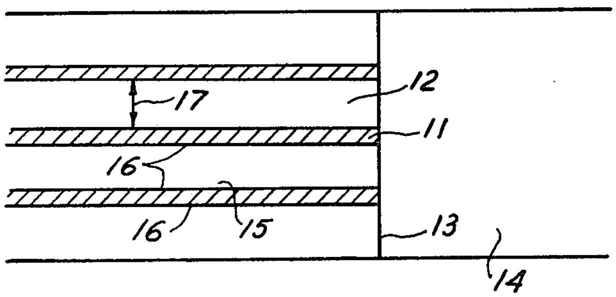
FIG. 3 illustrates forms of the growth of the ductile and magnetic phases according to the phase diagram of FIG. 1.

A similar improvement in the mechanical properties and magnetic properties of a body can be obtained by casting the alloy in a mold which is cooled at the base, thereby carrying out directed solidification. Using an alloy of the composition y of FIG. 1, a structure similar to that in FIG. 3 is obtained although the fibers may be partly or completely in cellular or dendritic form. Similarly with the alloys shown in FIG. 2, e.g. of composition y, a structure similar to that shown in FIG. 4, although the dendrites may have secondary branches, is formed.

Figure 5:
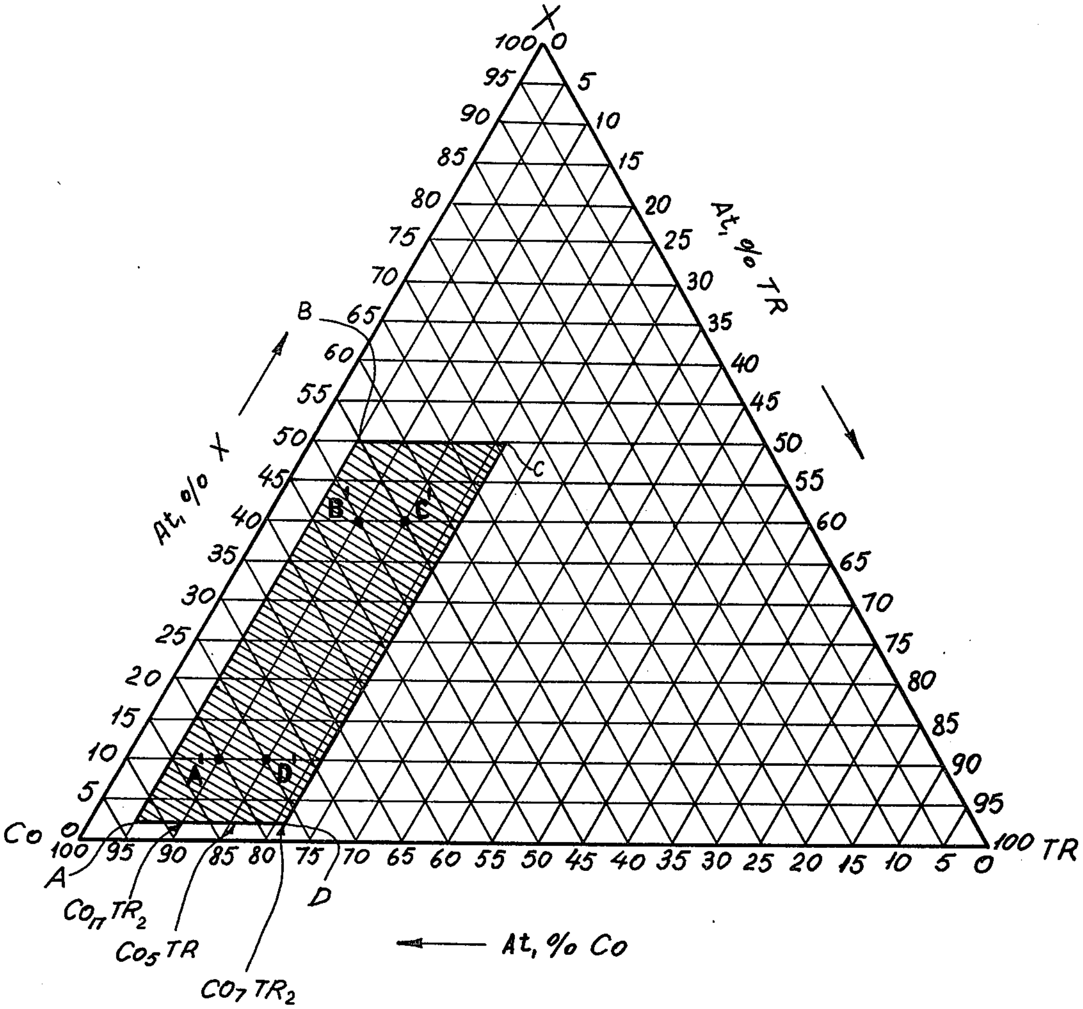
FIG. 5 is a ternary diagram illustrating compositions which are examples of the alloys of the present invention.

The compositions from which magnetic alloys can be prepared according to the invention are represented by the shaded region A, B, C, D of FIG. 5 in which the cobalt content is plotted along the lower axis in atomic percent the TR content is plotted along the right hand axis in atomic percent and the replacement metal X is plotted along the left hand axis in atomic percent. The shaded diagram represents compositions between (Co+5 at. % TR) and $Co_5$ TR with between 10 and 40 at. % of the element X, where X is one or more of the elements iron, nickel, aluminum, copper, chromium, molybdenum and manganese. In the preferred composition TR is present in an amount of 10 to 15 atomic percent of the alloy, X constitutes 10 to 40 atomic percent of the alloy and cobalt 50 to 80 atomic percent of the alloy (region A', B', C' and D' of FIG. 5).

The advantages of the magnets according to the present invention are numerous. They have high magnetic properties which are stable over long periods and under various environmental conditions. Their mechanical properties are superior to those of TR-cobalt magnets as are presently available, particularly with respect to their ability to be machined as proven by comparative tests. They can be machined by chip-removal methods, thereby allowing magnets of all shapes and sizes to be fabricated. They can be readily ground and hence given precision dimensions. Their toughness is superior to commercial TR-cobalt magnets. Finally, it is possible to cast large pieces by the methods described above, since the improvement of the mechanical properties of the pieces allows them to be better able to resist the thermal stresses occurring on cooling.

The precipitation hardening can be carried out by subjecting the cast body to a solution treatment at a temperature above 900° C. followed by precipitation by example at 400° to 700° C. for one to two hours.

The following alloy compositions are subjected to directional solidification and precipitation hardening with the effects described:

| Composition | Constituents | Atomic Percent | Br KGs | Hc KOe |
|---|---|---|---|---|
| I | cobalt | 55 | | |
| | samarium | 12 | 5 | 5 |
| | copper | 25 | | |
| | iron | 5 | | |
| | lanthanum | 3 | | |
| II | cobalt | 55 | | |
| | samarium | 12 | 6 | 5 |
| | nickel | 10 | | |
| | copper | 15 | | |
| | iron | 5 | | |
| | lanthanum | 3 | | |
| III | cobalt | 67 | | |
| | samarium | 9 | | |
| | copper | 15 | 8 | 1 |
| | iron | 5 | | |
| | lanthanum | 4 | | |
| IV | samarium | 8 | | |
| | praseodymium | 6 | | |
| | cobalt | 61 | 7 | 4 |
| | copper | 20 | | |
| | iron | 5 | | |
| V | samarium | 10 | | |
| | cerium | 4 | | |
| | iron | 5 | 8 | 3 |
| | copper | 15 | | |
| | cobalt | 66 | | |
| VI | cobalt | 63 | | |
| | lanthanum | 6 | similar to | |
| | copper | 25 | composition III | |
| | samarium | 6 | | |
| VII | samarium | 12 | | |
| | lanthanum | 2 | 7.5 | 2 |
| | cobalt | 56 | | |
| | copper | 20 | | |
| | iron | 10 | | |
| VIII | samarium | 10 | | |
| | cerium | 4 | | |
| | copper | 15 | 7.5 | 3 |
| | cobalt | 71 | | |
| IX | copper | 15 | | |
| | aluminum | 15 | | |
| | molybdenum | 5 | | |
| | cerium | 10 | | |
| | cobalt | 55 | | |
| X | samarium | 10 | | |
| | lanthanum | 4 | | |
| | copper | 15 | | |
| | nickel | 5 | | |
| | cobalt | 56 | | |
| | iron | 5 | | |
| | aluminum | 5 | | |
| XI | samarium | 6 | | |
| | lanthanum | 3 | | |
| | cerium | 1 | | |
| | copper | 6 | | |
| | nickel | 5 | | |
| | cobalt | 61 | | |
| | iron | 5 | | |
| XII | samarium | 10 | | |
| | lanthanum | 3 | | |

-continued

| Composition | Constituents | Atomic Percent | Br KGs | Hc KOe |
|---|---|---|---|---|
| | praseodymium | 5 | | |
| | copper | 15 | | |
| | nickel | 10 | | |
| | cobalt | 52 | | |
| | iron | 5 | | |

The magnetic properties cited are the saturation, magnetization (Bs) and the coercive force (Hc).

A preferred composition has TR constituted by a mixture of Sm with La, Pr and/or Ce and can contain up to 40 at. % La, Pr, Ce. The X is preferably copper or copper mixed with up to 50 at. % of the X component of Fe, Cr, Ni, Al. A most suitable composition comprises TR=10 to 15 at. % of which the major constituent is Sm, 5 at. % Fe, or Fe+Cr copper or Cu+Ni from 5 to 20 at. %, balance cobalt.

From the foregoing it will be apparent that, while the alloy contains 10 to 15 at. % TR, the ductile phase is composed essentially of cobalt (and chromium or chromium+iron) and the composition of the magnetic matrix is represented between $TR(Co,X)_5$ to $TR_2(Co,X)_{17}$.

Figure 6:
FIG. 6 is a photomicrograph (5× enlargement) illustrating the composite structure of the material of the present invention.

FIG. 6 shows, in photomicrograph form, the composite of the present invention in which the ductile cobalt dendrites can readily be distinguished from the brittle magnetic matrix.

Figure 7:
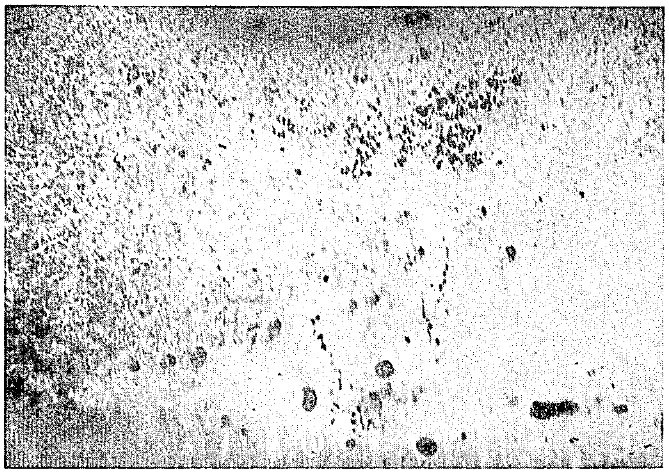
FIG. 7 is a photomicrograph (6×) of a microstructure of an alloy according to the invention with ductile cobalt dendrites evidencing no cracking although it was subjected to solidification at a high cooling rate.
Figure 8:
FIG. 8 is a photomicrograph of the alloy of FIG. 7 (6×) without ductile cobalt dendrites showing the cracking resulting from cooling with the same regimen.

After a regimen of rapid cooling the composite of the invention (FIG. 7) shows no evidence of cracking (composition corresponding to that of Example XIII) while a similar composition (modified to avoid dendrites but reproduce the matrix composition) without the formation of the ductile dendrites (FIG. 8) shows heavy cracking.

Figure 9:
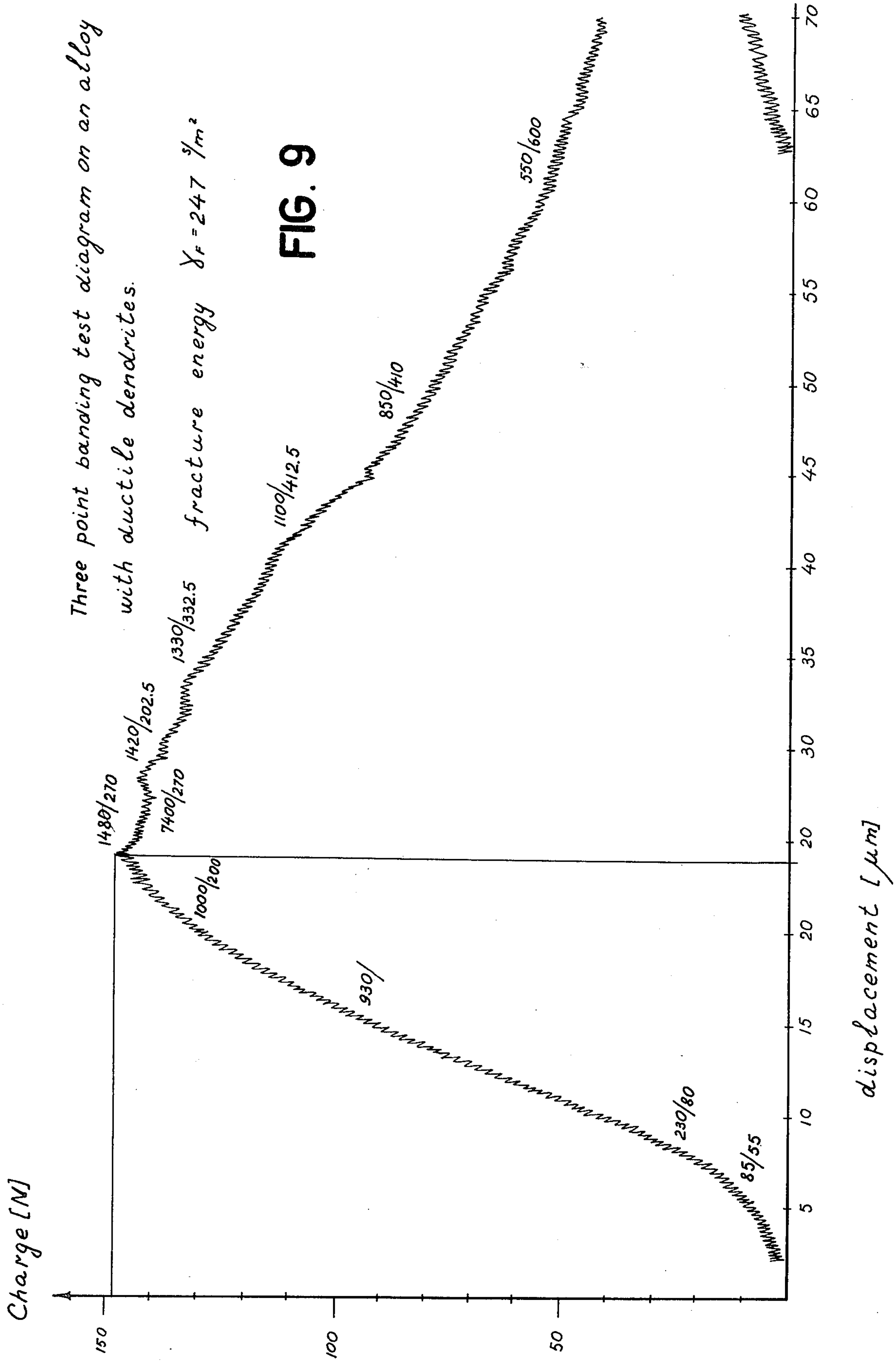
FIG. 9 is a graph showing the results of the three-point bending test of an alloy with ductile dendrites according to the invention.
Figure 10:
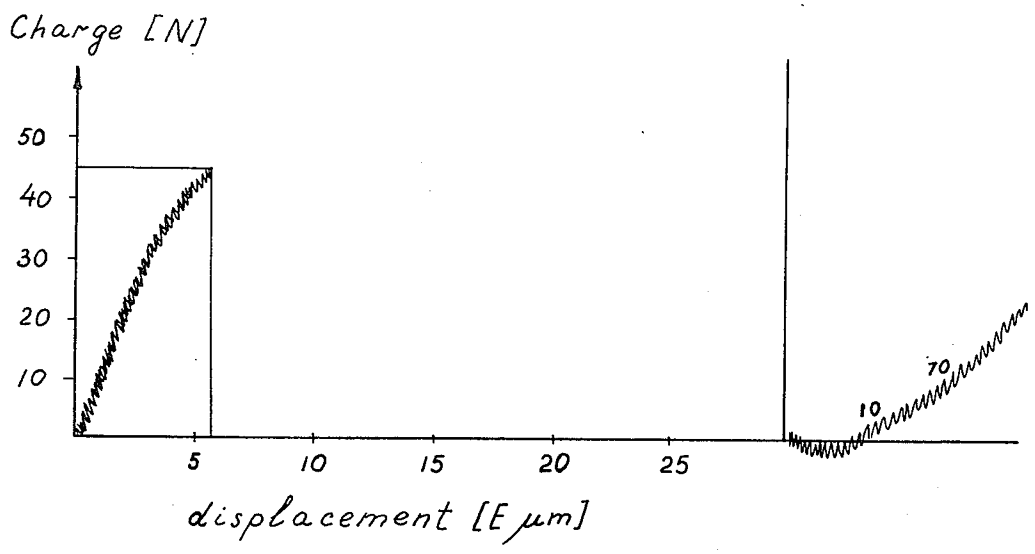
FIG. 10 is a graph showing the corresponding results for an alloy without ductile dendrites.

FIGS. 9 and 10 give the test results for these two alloys, showing the remarkable improvement resulting from the presence of the cobalt ductile dendrites. All of the compositions given have good magnetic properties as well.

Figure 11:
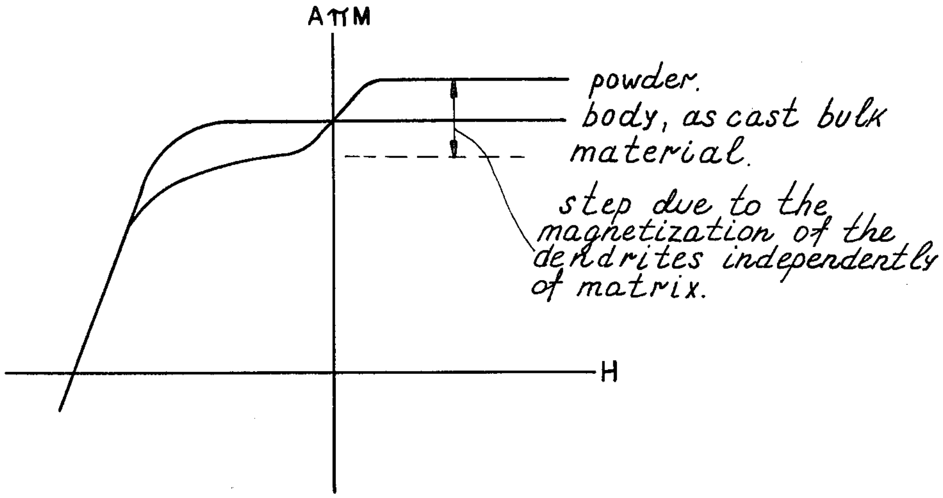
FIG. 11 is a hysteresis diagram illustrating a feature of the invention.

In the magnetic bodies as described, the magnetic behavior shows no signs of resulting from a "composite" body in that the hysteresis loops are essentially undeformed and reasonably square (see FIG. 11), despite the fact that the ductile dendrite phase is magnetically soft. These dendrites appear not to contribute to the overall behavior when they are grown "in situ". Once the material is ground finely the expected composite behavior is manifested.

Thus for an alloy of composition (by weight) 11% Sm, 15% Cu, 5% Fe, 2% Cr balance Co (~20% dendrites) the directionally solidified body has the same values for $4\pi M_s$ and Br of ~7.5 kGs. The same body reduced to powder has the same value for Br but the values of $4\pi M$ in the first quadrant of the hysteresis loop are increased to ~9.0 kGs and in the second (technically important) quadrant, reduced by a similar amount due to the effect of the dendrites.

The three-point bend test is effected on a notched square-section bar, in which the fracture surface is triangular as defined by the notches.

The method is well known and was developed by Tattersall and Tappin, Ref. J. Mat. Sci. 1 (1966) 296.

TABLE 1

RESULTS OF MICROPROBE ANALYSIS OF Cr-CONTAINING MAGNETS

| | | Co | Sm | Cu | Fe | Cr | Approx. % |
|---|---|---|---|---|---|---|---|
| ALLOY No. 1 | | 66.5 | 13.5 | 15.0 | — | 5.0 | |
| Dendrite Phase | | 79.6 | 0.8 | 1.3 | — | 18.3 | ~10% |
| Matrix Phases | 2:17 type | 74.1 | 11.8 | 8.3 | — | 6.1 | ~30% |
| | 1:5 type | 61.6 | 15.7 | 20.2 | — | 2.5 | ~60% |
| ALLOY No. 2 | | 64.0 | 12.5 | 12.5 | 8.0 | 3.0 | |
| Dendrite Phase | | 73.7 | 0.7 | 1.7 | 14.5 | 9.3 | ~5% |
| Matrix Phases | 2:17 type | 67.8 | 11.1 | 7.6 | 9.0 | 3.8 | ~45% |
| | 1:5 type | 58.7 | 14.6 | 18.2 | 7.8 | 2.1 | ~50% |
| ALLOY No. 3 | | 68.0 | 10.0 Sm 2.5 La | 12.5 | 4.0 | 3.0 | |
| Dendrite Phase | | 80.0 | 0.8 | 1.9 | 7.7 | 9.6 | ~10% |
| Matrix Phases | 2:17 type | 74.2 | 11.3 | 7.0 | 4.1 | 3.4 | ~35% |
| | 1:5 type | 62.7 | 14.9 | 18.1 | 2.6 | 1.7 | ~55% |

(Atom. % applies to columns Co through Cr.)

TABLE 2

| COMPOSITION TR | Cu | Fe | Cr | % DENDRITES | (HEAT TREATMENT NOT OPTIMIZED) Hc(KOe) |
|---|---|---|---|---|---|
| 13.5 Sm | 15 | 0 | 5 | 20 | 3.2 |
| 13.5 Sm | 15 | 0 | 4 | 5 | 4.7 |
| 12.5 Sm | 15 | 0 | 3 | 10 | 4.5 |
| 12.5 Sm | 12.5 | 0 | 4 | 5 | 4.1 |
| 11.0 Sm 2.5 La | 15 | 0 | 5 | 20 | 3.2 |
| 11.0 Sm 2.5 Pr | 15 | 0 | 5 | 20 | 3.8 |
| 10.0 Sm 2.5 Pr | 12.5 | 4 | 3 | 25 | 3.9 |
| 10.0 Sm 2.5 Ce | 12.5 | 4 | 3 | 20 | 5.3 |
| 12.5 Sm | 12.5 | 4 | 3 | 5 | 4.8 |
| 12.5 Sm | 12.5 | 12 | 0 | 2 | 4.6 |
| 11.3 Sm | 13.7 | 4.3 | 2 | 12 | 4.5 |
| 11.4 Sm | 13.7 | 4.3 | 2 | 10 | 6.5 |
| 11.4 Sm | 13.7 | 8.3 | 2 | 15 | 6.3 |
| 11.3 Sm | 13.7 | 6.3 | 2 | 15 | 5.8 |
| 11.3 Sm | 13.7 | 6.3 | 1 | 5 | 4.1 |

EXAMPLES

| | COMPOSITION % AT. | | | | | STRUCTURE VOLUME % | | | MAGNETIC PROPERTIES | | | MECHANICAL PROPERTIES | |
|---|---|---|---|---|---|---|---|---|---|---|---|---|---|
| | | | | | | % ductile | % | % | | | | fracture energy | bend strength |
| | Sm | Co | Cu | Fe | Cr | dendrites | 2:17 | 1:5 | Hc(KOe) | Ms(KGs) | $BH_{max}$ | $Jm^{-2}$ | $MNm^{-2}$ |
| XIII | 10 | 70 | 14 | 5 | 1 | 20 | 75 | 5 | 5.4 | 8.0 | 13 | 110 | 75 |
| XIV | 10 | 69.5 | 14 | 5 | 1.5 | 25 | 70 | 5 | 6.0 | 7.6 | 12 | 140 | 85 |
| XV | 10.5 | 67.5 | 15 | 5 | 2 | 25 | 60 | 20 | 6.2 | 7.5 | 12 | 140 | 85 |
| XVI | 11 | 67 | 15 | 5 | 2 | 20 | 55 | 25 | 6.0 | 7.5 | 12 | 110 | 75 |
| XVII | 11.5 | 66.5 | 15 | 5 | 2 | 15 | 45 | 40 | 6.0 | 7.7 | 12.5 | 80 | 65 |
| XVIII | 11 | 69 | 14 | 5 | 1 | 10 | 60 | 30 | 6.0 | 8.3 | 14.5 | 50 | 55 |
| XIX | 11 | 64 | 14 | 10 | 1 | 15 | 50 | 35 | 5.5 | 8.5 | 15.5 | 80 | 65 |
| XX | 10.5 | 69.5 | 13 | 6 | 1 | 15 | 65 | 20 | 5.8 | 8.3 | 15 | 80 | 65 |

We claim:

1. A magnetic alloy for a ductile permanent magnet made by directional solidification comprising a ductile phase consisting essentially of cobalt and chromium or of cobalt, chromium and iron in a brittle, magnetic matrix whose composition lies between $TR(Co,X)_5$ and $TR_2(Co,X)_{17}$, where TR is at least one element selected from the group which consists of samarium, gadolinium, praseodynium, cerium, neodymium, holmium, lanthanum, and yttrium; X is at least one metal selected from the group which consists of copper, iron, chromium, nickel, aluminum, molybdenum, and manganese; TR is present in an amount of 10 to 15 at % of the alloy, X is present in an amount of 10 to 40 at % of the alloy, cobalt is present in an amount of 50 to 80 at % of the alloy; and chromium is present in an amount of 0.5 to 5 at % of the alloy.

* * * * *